United States Patent [19]

Djabbarah

[11] Patent Number: 4,899,817

[45] Date of Patent: Feb. 13, 1990

[54] MISCIBLE OIL RECOVERY PROCESS USING CARBON DIOXIDE AND ALCOHOL

[75] Inventor: Nizar F. Djabbarah, Richardson, Tex.

[73] Assignee: Mobil Oil Corporation, New York, N.Y.

[21] Appl. No.: 284,563

[22] Filed: Dec. 15, 1988

[51] Int. Cl.⁴ .................. E21B 43/22; E21B 43/24
[52] U.S. Cl. .................................. 166/252; 166/268; 166/272; 166/273; 166/274
[58] Field of Search ............... 166/252, 268, 272–274, 166/303, 305.1; 73/19

[56] References Cited

U.S. PATENT DOCUMENTS

| | | | |
|---|---|---|---|
| 3,334,688 | 8/1967 | Blackwell et al. | 166/273 |
| 3,402,770 | 9/1968 | Messenger | 166/272 X |
| 3,439,743 | 4/1969 | Wyllie | 166/273 X |
| 3,497,007 | 2/1970 | Williams et al. | 166/273 |
| 3,811,501 | 5/1974 | Burnett et al. | 166/252 |
| 3,811,502 | 5/1974 | Burnett | 166/252 |
| 4,299,286 | 11/1981 | Alston | 166/274 |
| 4,410,043 | 10/1983 | Hall et al. | 166/273 |
| 4,455,860 | 6/1984 | Cullick et al. | 73/19 |
| 4,558,740 | 12/1985 | Yellig, Jr. | 166/272 |
| 4,605,066 | 8/1986 | Djabbarah | 166/274 X |
| 4,609,043 | 9/1986 | Cullick | 166/268 |
| 4,678,036 | 7/1987 | Hartman | 166/273 |
| 4,736,793 | 4/1988 | Djabbarah | 166/273 |
| 4,800,957 | 1/1989 | Stevens, Jr. et al. | 166/268 |

Primary Examiner—George A. Suchfield
Attorney, Agent, or Firm—Alexander J. McKillop; Charles J. Speciale; Charles A. Malone

[57] ABSTRACT

A process for modifying the minimum miscibility pressure (MMP) of a drive fluid and hydrocarbonaceous fluid mixture by addition of alcohol to the drive fluid. Alcohols which can be utilized include methanol through octanol. The preferred drive fluid comprises carbon dioxide. Selection of the alcohol will depend on the water saturation in the reservoir and gravity of the crude oil. MMP modification results in an increased and more efficient recovery of reservoir oil.

30 Claims, 1 Drawing Sheet

MISCIBLE OIL RECOVERY PROCESS USING CARBON DIOXIDE AND ALCOHOL

FIELD OF THE INVENTION

This invention relates to the recovery of oil from subterranean, oil-bearing reservoirs using a miscible displacement fluid such as carbon dioxide.

BACKGROUND OF THE INVENTION

In the recovery of oil from subterranean, oil-bearing formations or reservoirs, it is usually possible to recover only a limited proportion of the original oil present in the reservoir by the so-called primary recovery methods which utilize the natural formation pressure to produce the oil through suitable production wells. For this reason, a variety of supplementary recovery techniques have been employed, directed either to maintaining formation pressure or to improving the displacement of the oil from the porous rock matrix. Techniques of this kind have included formation pressurization, thermal recovery methods such as steam flooding and in situ combustion, water flooding and miscible flooding techniques.

In miscible flooding operations, a solvent is injected into the reservoir to form a single phase solution with the oil in place so that the oil can then be removed as a more highly mobile phase from the reservoir. This provides extremely effective displacement of the oil in the areas through which the solvent flows, so that an extremely low residual saturation is obtained. The efficiency of this process derives from the fact that under the conditions of temperature and pressure prevailing in the reservoir, a two-phase system within the reservoir between the solvent and the reservoir oil is eliminated. When this happens the retentive forces of capillarity and interfacial tension which are significant factors in reducing the recovery efficiency of oil in conventional flooding operations where the displacing agent and the reservoir oil exist as two separate phases, are eliminated or substantially reduced.

Miscible recovery operations are normally carried out by a displacement procedure in which the solvent is injected into the reservoir through an injection well to displace the oil from the reservoir towards a production well from which the oil is produced. Because the solvent, typically a light hydrocarbon such as liquid petroleum gas (LPG) or a paraffin in the $C_2$ to $C_6$ range, may be quite expensive, it is often desirable to carry out the recovery by injecting a slug of the solvent, followed by a cheaper displacement liquid such as water. However, the economics of miscible recovery operations using first contact miscible solvents such as LPG or light hydrocarbons are quite unattractive.

Of the various miscible recovery processes so far used or proposed, flooding by carbon dioxide is considered to be of substantial promise. In the carbon dioxide flooding technique, a slug of carbon dioxide is injected into the formation to mobilize the oil and permit it to be displaced towards a production well. Carbon dioxide is considered a miscible-type flooding agent because under supercritical conditions, usually high pressure, carbon dioxide acts as a solvent and in certain reservoir situations, has a great advantage over more common fluids as a displacement agent. Even under conditions where the carbon dioxide is not wholly effective as a solvent for the oil, recovery may be improved by taking advantage of the solubility of carbon dioxide in the oil, causing a viscosity reduction and a swelling of the oil, which leads to increased recovery. These effects have been utilized at pressures much lower than the miscibility pressures for carbon dioxide and oil. Processes using carbon dioxide as a recovery agent are described in U.S. Pat. Nos. 3,811,501, 3,811,502, 3,497,007, 4,299,286 and 4,410,043.

Carbon dioxide is not a first contact miscible solvent like LPG or a light hydrocarbon, which forms a single phase solution with the reservoir when the two come into contact, i.e. upon their first contact. Rather, carbon dioxide is a multiple contact miscible solvent which forms a single phase only after a period of time during which the carbon dioxide first preferentially extracts the light hydrocarbons containing from two to six carbon atoms from the crude oil, thereby developing a hydrocarbon-containing solution at the interface between the carbon dioxide and the crude oil. This solution is able to dissolve other, heavier hydrocarbons, i.e. $C_{6+}$ hydrocarbons and these progressively enter the solution to form the desired single phase which is then carried forward through the reservoir, progressively dissolving heavier hydrocarbons as it advances. Thus, as the flooding front advances through the reservoir, the composition of the displaced fluid gradually changes from the crude oil to that of the pure carbon dioxide.

Multiple contact miscibility is a function of the pressure of the system and the minimum pressure required to achieve multiple contact miscibility is called the minimum miscibility pressure of MMP. This varies according to the nature of the oil and of the solvent and in accordance with certain other factors. In some reservoirs, the minimum miscibility pressure may be unattainable due to factors such as low overburden pressure or the impracticality of pressurizing the reservoir. The presence of impurities, such as nitrogen or methane, may increase the MMP to levels beyond those attainable at reservoir conditions. For example, ten mole percent methane in $CO_2$ increased the MMP of a West Texas oil from 1200 to 1800 psi. The same amount of nitrogen increased the MMP of the same oil to 3300 psi (Stalkup, F.I., Miscible Displacement, SPE Monograph, Volume 8, page 141, Table 8.1, 1983). If the minimum miscibility pressure cannot be achieved in the reservoir, the flooding process will be immiscible in character and recovery from the solvent injection will be low.

The minimum miscibility pressure of carbon dioxide and other solvents may be decreased by the use of additives such as various low molecular weight hydrocarbons, e.g. $C_2$ to $C_6$ paraffins and the use of these additives may permit miscible flooding to be carried out in reservoirs which do not premit the minimum miscibility pressure to be attained. Although the use of a solubility additive of this kind is undoubtedly favorable, it does have the disadvantage of making the process less economically attractive since the additives are not completely recovered from the reservoir and to this extent, their cost must be considered in the economics of the process. It would therefore be desirable to minimize the amount of the solubility additive which needs to be used.

SUMMARY OF THE INVENTION

This invention is directed to the use of alcohol in combination with carbon dioxide to facilitate removal of crude oil and other hydrocarbonaceous fluids from a formation. A slug of carbon dioxide in combination with alcohol is injected into the formation. The alcohol can be injected as a mixture with carbon dioxide. Also, a slug of carbon dioxide can be injected into the formation followed by a slug of alcohol. When injected along with carbon dioxide, alcohol lowers the minimum miscibility pressure (MMP) of a carbon dioxide/crude oil composition in the formation. Lowering the MMP allows miscibility between the displacing and the contiguous fluid (e.g., crude oil) to be achieved at a lower pressure within a shorter distance.

Additionally, alcohol increases the viscosity and the density of a displacing fluid such as carbon dioxide. Some of the alcohol partitions into the oil phase thereby reducing its density and viscosity. Viscous fingering is reduced because of the decrease in the viscosity difference between the displacing fluid (carbon dioxide-alcohol mixture and the displaced fluid (crude oil). Additionally, the tendency for the carbon dioxide to gravity override is significantly reduced because the density difference between the displacing and the displaced fluids is reduced. Utilization of alcohol in combination with a displacing fluid such as carbon dioxide results in an increased and more efficient recovery of crude oil and other hydrocarbonaceous fluids.

In addition to the use of carbon dioxide as a displacing fluid, flue gas, methane, ethane, propane, nitrogen, hydrogen sulfide, and steam can be used along with combinations of these displacing fluids.

It is therefore an object of this invention to use alcohol in combination with a drive fluid to lower the MMP of the drive fluid and crude oil composition.

It is another object of this invention to obtain miscibility of a drive fluid and crude oil composition with a shorter distance within a formation.

It is still another object of this invention to use alcohol in combination with a drive fluid to increase the viscosity of the drive fluid, reduce the viscosity of the displaced fluid (or crude oil), and minimize drive fluid fingering in a formation during the recovery of crude oil.

It is a still further object of this invention to use alcohol in combination with a drive fluid to increase the drive fluid's density, reduce the density of crude oil and thereby minimize segregation due to density differences between a displaced and a displacing fluid.

BRIEF DESCRIPTION OF THE PREFERRED EMBODIMENTS

Figure 1:
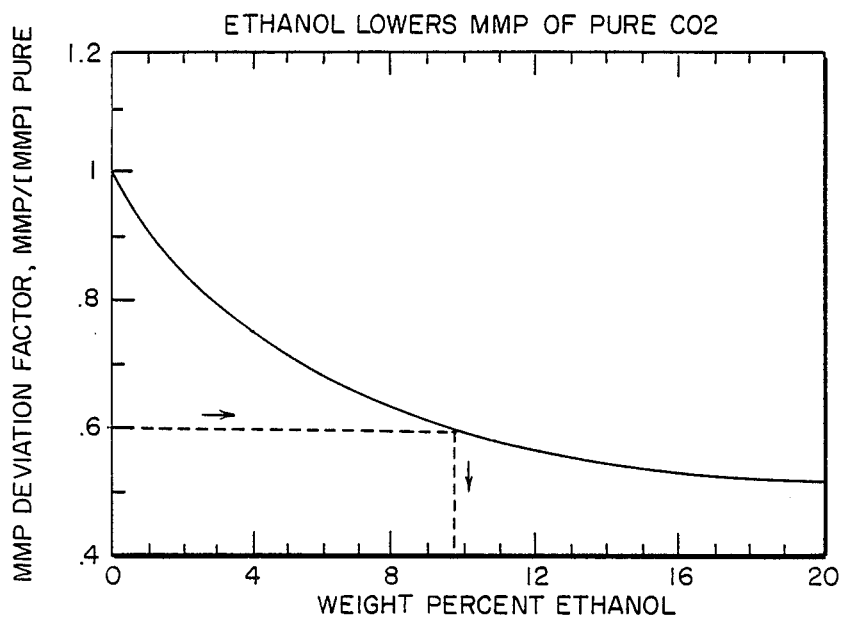
FIG. 1 is a graph which illustrates the effect of ethanol on the MMP of pure carbon dioxide.

The oil is recovered from the subterranean, oil-bearing formation or reservoir by injecting a solvent into the reservoir through an injection well and recovering fluids from a production well which is at a horizontal distance or offset from the injection well. In practice, more than one injection well and more than one production well may be used and these may be arranged in a number of different patterns suitable for solvent drive operations of this kind. For example, the wells may be arranged for a line drive with the injection wells arranged in a line and the production wells in lines parallel to the injection wells or in a pattern such as five spot, inverted five spot, seven spot, inverted seven spot or other conventional arrangements. For simplicity, however, the present invention is described below with reference only to a single injection well and a single production well.

The preferred solvent or displacing fluid for use herein is carbon dioxide combined with alcohol to reduce the MMP. The MMP of reservoir or formation oil can be determined by a method described in U.S. Pat. No. 4,455,860 which issued to Cullick et al. on June 26, 1984. This patent is hereby incorporated by reference herein in its entirety. Use of carbon dioxide as a solvent in connection with the recovery of oil from a formation is discussed in U.S. Pat. No. 4,678,036 which issued to Hartman et al. on July 7, 1987. This patent is hereby incorporated by reference herein in its entirety. Although carbon dioxide is the preferred displacing fluid, other displacing fluids may be utilized such as flue, methane, ethane, butane, nitrogen, hydrogen sulfide, or steam and combinations thereof.

When carbon dioxide is used as a solvent or displacing fluid, it should be injected under sufficient pressure so that under the conditions which prevail in the reservoir, it is present as a dense phase, that is, it is under supercritical conditions and present neither as a liquid or a dense vapor. Generally, this will be achieved by maintaining pressure in the reservoir sufficiently high to maintain the carbon dioxide in the required dense phase state, i.e. at a density greater than approximately 0.468 g cm.$^{-3}$. This pressure, in itself, increases with increasing reservoir temperature and the pressure should therefore be chosen in accordance with reservoir temperature. Typical minimum pressures for maintaining the dense phase state are 900 psia at 85° F., 1200 psia at 100° F., 1800 psia at 150° F., 2500 psia at 200° F. and 3100 psia at 250° F. (6205 kPa at 30° C., 8275 kPa at 38° C., 12410 kPa at 65° C., 17235 kPa at 93° C. and 21375 kPa at 120° C.). However, the pressure actually necessitated in the reservoir will also depend upon the MMP of the crude oil, using the alcohol which has been selected. This may be found by simple experiment, using samples of the reservoir crude, the selected alcohol and the selected solvent or displacing fluid. The amount of solvent used will generally be in the range of 0.3–0.6 hydrocarbon pore volume (HCPV) with an optimal range of about 0.35 to 0.45 although this will depend upon reservoir and crude characteristics as well as other factors. For any reservoir, the optimum quantity of solvent or displacing fluid may be found by suitable experiment or simulation prior to the start of actual recovery operations.

The solvent or displacing fluid is initially injected into the formation with a predetermined amount of the selected alcohol at pressures greater than the MMP but near the current resevoir pressure if this is below the MMP (if the reservoir pressure is above the MMP, the carbon dioxide will form a single phase solution without the necessity of the alcohol although it may be desirable to use the additive for other reasons). The alcohol is present in the initial portion of the solvent in an amount which is sufficient to lower the MMP to a value which is no higher than the reservoir pressure so that multiple contact miscibility is attained as the bank of solvent begins to permeate the reservoir.

An alcohol chosen for use herein will depend on the water saturation of the reservoir in the reservoir as well as the type and composition of the crude oil or hydrocarbonaceous material. The alcohol utilized can be selected from methanol through octyl alcohol ($CH_3OH-C_8H_{17}OH$). Where water saturation is low and the API gravity is equal to or greater than 35, alcohols of choice are chosen from the family comprising methanol through butanol. As is known, methanol has a high solubility in water and is practically insoluble in $C_1-C_{10}$ hydrocarbons. When the water saturation is low and the API gravity is less than about 35, the alcohol is selected from a member of the family comprising butanol through octyl alcohol. It is known for example that n-octyl alcohol is only slightly soluble in water and very soluble in hydrocarbons. The concentration of alcohol in carbon dioxide varies depending on reservoir fluid properties from about 5 to about 40 percent by weight.

The alcohol type (e.g. chain length and degree of branching) can be selected by conducting a series of slim tube displacements. A rough estimate of alcohol concentration can be made by using any of the published MMP correlation. These include one by Alston, R. B. et al., "$CO_2$ Minimum Miscibility Pressure: A Correlation for Impure $CO_2$ Streams and Live Oil Systems", Soc. of Pet. Eng. J., April, 1985, pages 268–274. The correlation relates the MMP deviation factor (F) to the weight average critical temperature of the displacing fluid as shown below.

$$F = \left(\frac{87.8}{Tcm}\right)^{\frac{169.9}{Tcm}} \quad (1)$$

$$F = \frac{MMP}{(MMP)_{pure}} \quad (2)$$

$$Tcm = \sum_{i=1}^{n} W_i \, Tci - 459.7 \quad (3)$$

where
MMP = the minimum miscibility pressure of $CO_2$ alcohol-crude oil system.
$(MMP)_{Pure}$ = the minimum miscibility pressure of pure $CO_2$-crude oil system.
Tcm = weight average critical temperature, °F.
Wi = weight fraction of component i in the displacing fluid.
Tci = critical temperature of component i, °R.

A MMP deviation factor versus displacing fluid composition curve for ethanol appears in FIG. 1. This curve was generated by utilization of equations 1–3. Referring to FIG. 1, in order to determine a desired injection pressure of 1,500 psi and if the MMP of a $CO_2$/crude oil system is 2,500 psi, F equals 1,500 psi divided by 2,500 psi or 0.6. To obtain the desired MMP reduction of 1,500 psi requires the addition of about 10 wt. % of ethanol to 90 wt. % of pure $CO_2$ as is shown in FIG. 1.

Figure 2:
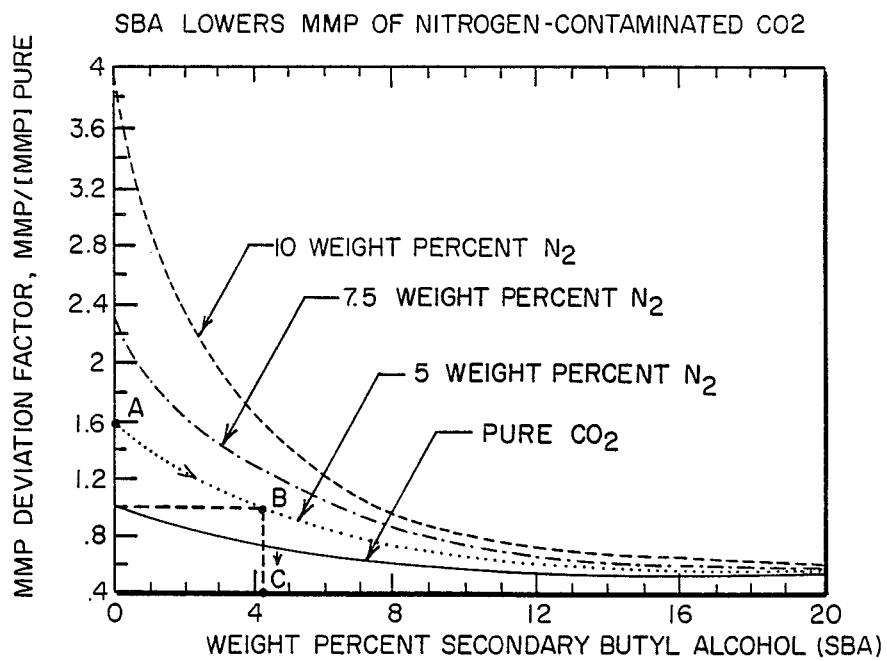
FIG. 2 is a graph illustrative of how SBA lowers the MMP of nitrogen contaminated carbon dioxide.

Alcohol may also be used to restore the miscibility of contaminated $CO_2$. As is shown in FIG. 2, curves depict the required adjustments for changing the miscibility of a $CO_2$/nitrogen system with secondary butyl alcohol (SBA). Referring to FIG. 2, (Point A) the addition of 5 wt. % of nitrogen to pure $CO_2$ increases the MMP of pure $CO_2$ by a factor of 1.6. The original MMP (Point B) can be restored by the addition of about 4 wt. % of SBA.

Alcohol can be used as an additive to establish miscibility using other displacing fluids such as nitrogen, methane, ethane, propane, liquid petroleum gas, hydrogen sulfide, flue gas, steam or any mixture thereof. They can also be used to provide a leveling effect in a reservoir where the oil composition varies with location (compositional gradients). Composition gradients are discussed in a paper by A. M. Schulte entitled "Compositional Variations Within A Hydrocarbon Column," SPE No. 9235, presented at the Annual Fall Meeting of the Society of Petroleum Engineers, Sept. 21–24, 1980, Dallas, Texas. Compositional gradients give rise to miscibility pressure gradients which can be reduced by addition of an appropriate alcohol.

In the practice of this invention, a displacing fluid such as $CO_2$ is injected into a reservoir or formation in combination with a desired alcohol. The alcohol can be mixed with carbon dioxide and injected into the formation. Alternatively, a slug of carbon dioxide or other displacing fluid can be injected into the formation followed by a slug of alcohol. Slug injection can be continued until the MMP has been lowered as desired and the desired penetration into the formation has been obtained. As mentioned above, alcohol lowers the MMP of a displacing fluid such as $CO_2$ and crude oil. Lowering the MMP allows miscibility between the displacing and the contiguous fluid (e.g. crude oil) to be achieved at a lower pressure within a shorter distance.

Additionally alcohol increases the viscosity and density of the displacing fluid while reducing the viscosity and density of the crude oil. The alterations in viscosity mean smaller viscosity differences between the displacing and displaced fluids. They therefore reduce the tendency of the displacing fluid to finger through the formation. The changes in density result in smaller density differences between the displaced and displacing fluids. They therefore reduce the tendency of the displacing fluid to gravity override the displaced fluid. Utilization of alcohol in combination with a displacing fluid results in increased and more efficient recovery of crude oil and other hydrocarbonaceous fluids.

The preferred method in carrying out this invention is to inject $CO_2$ at the injection well until it breaks through at the production well. Afterwards, a slug containing alcohol and $CO_2$ in an amount sufficient to obtain the desired MMP is injected into the reservoir. Thereafter, a slug of $CO_2$ would be injected into the reservoir. This sequence can be repeated until the desired MMP has been obtained. The size of the $CO_2$/alcohol slug would depend on the reservoir and fluid properties. However, the $CO_2$/alcohol slug should not exceed about 20 wt. % of the initial $CO_2$ slug.

Alternatively, the above order may be reversed by first injecting the $CO_2$-alcohol slug first and following it by $CO_2$. A third method may involve the continuous injection of the $CO_2$-alcohol mixture.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:
1. A method for modifying the minimum miscibility pressure of a displacing fluid utilized in the recovery of hydrocarbonaceous fluids from a reservoir comprising:
   (a) determining an existing minimum miscibility pressure (MMP) of a displacing fluid and a hydrocarbonaceous fluid mixture in a reservoir;
   (b) determining the extent to which it is desired to modify the minimum miscibility pressure of said mixture; and

(c) adding alcohol to said displacing fluid in an amount sufficient to modify said pressure to the extent desired which alcohol is selected from the family comprising methanol through octanol and mixtures thereof.

2. The method as recited in claim 1 where the displacing fluid is a member selected from the group consisting of carbon dioxide, flue gas, methane, ethane, butane, nitrogen, hydrogen sulfide, or steam and mixtures thereof.

3. The method as recited in claim 1 where after step (c) said displacing fluid containing said alcohol is injected into the reservoir until the desired MMP has been obtained and a hydrocarbonaceous fluid mixture is produced from the reservoir.

4. The method as recited in claim 1 where after step (c) said displacing fluid containing said alcohol is injected into the reservoir followed by a slug of displacing fluid from step (a) until the existing minimum miscibility pressure has been lowered to the extent desired.

5. The method as recited in claim 1 where the existing minimum miscibility pressure is lowered.

6. The method as recited in claim 1 where alcohol provides a leveling effect in a reservoir where the oil composition varies at different locations within the reservoir which leveling effect causes a reduction in miscibility pressure gradients.

7. The method as recited in claim 1 where alcohol increases the density and viscosity of the displacing fluid thereby reducing the tendency of the fluid to segregate or finger through the reservoir.

8. The method as recited in claim 1 where alcohol increases the density and the viscosity of said displacing fluid while reducing the viscosity and density of the hydrocarbonaceous fluids thereby reducing the tendency of the displacing fluid to segregate or finger through the reservoir.

9. The method as recited in claim 1 where the displacing fluid is carbon dioxide into which alcohol is included in an amount of about 5 to about 40 wt. %.

10. The method as recited in claim 1 where said alcohol is used to restore the miscibility of a contaminated displacing fluid.

11. The method as recited in claim 1 where said alcohol and displacing fluid are continuously injected into said reservoir until the desired MMP is obtained and hydrocarbonaceous fluids are produced from said reservoir.

12. The method as recited in claim 1 where said displacing fluid and alcohol are injected into the reservoir followed by a slug of displacing fluid and this sequence is repeated until the desired MMP is obtained and a hydrocarbonaceous fluid mixture is produced from said reservoir.

13. A method for modifying the minimum miscibility pressure (MMP) of a displacing fluid utilized in the recovery of hydrocarbonaceous fluids from a reservoir comprising:
    (a) injecting a displacing fluid into a reservoir and recovering the displacing fluid and hydrocarbonaceous fluid mixture until displacing fluid breakthrough occurs;
    (b) determining said mixture's existing minimum miscibility pressure;
    (c) determining the extent to which it is desired to modify the existing minimum miscibility pressure; and
    (d) adding alcohol to said displacing fluid in an amount sufficient to modify said pressure to the extent desired which alcohol is selected from the family comprising methanol through octanol and mixtures thereof.

14. The method as recited in claim 13 where the displacing fluid is a member selected from the group consisting of carbon dioxide, flue gas, methane, ethane, butane, nitrogen, hydrogen sulfide, or steam and mixtures thereof.

15. The method as recited in claim 13 where after step (d) said displacing fluid containing said alcohol is injected into the reservoir until the desired MMP has been obtained and a hydrocarbonaceous fluid mixture is produced from the reservoir.

16. The method as recited in claim 13 where following step (d) said displacing fluid containing the alcohol is injected into the reservoir after injecting a slug of displacing fluid until the existing minimum miscibility pressure has been lowered to the extent desired.

17. The method as recited in claim 13 where the existing minimum miscibility pressure is lowered.

18. The method as recited in claim 13 where alcohol provides a leveling effect in a reservoir where the oil composition varies at different locations within the reservoir which leveling effect causes a reduction in miscibility pressure gradients.

19. The method as recited in claim 13 where alcohol increases the density and the viscosity of said displacing fluid while reducing the viscosity and density of the hydrocarbonaceous fluids thereby reducing the tendency of the displacing fluid to segregate or finger through the reservoir.

20. The method as recited in claim 13 where alcohol increases the density and the viscosity of the hydrocarbon fluids thereby reducing the tendency of the displacing fluid to segregate or finger through the reservoir.

21. The method as recited in claim 13 where the displacing fluid is carbon dioxide into which alcohol is included in an amount of about 5 to about 40 wt. %.

22. The method as recited in claim 13 where after step (e) said displacing fluid containing said alcohol is injected into the reservoir until a desired MMP has been obtained and hydrocarbonaceous fluid mixture is produced from the reservoir.

23. The method as recited in claim 13 where after step (e) said displacing fluid containing the alcohol is injected into the reservoir which injection is thereafter followed by the injection of a slug of the displacing fluid into the reservoir until a desired MMP has been obtained and hydrocarbonaceous fluids are produced from the reservoir.

24. A method for modifying the minimum miscibility pressure (MMP) of a carbon dioxide displacing fluid utilized in the recovery of hydrocarbonaceous fluids from a reservoir comprising:
    (a) injecting a carbon dioxide displacing fluid into a reservoir so as to recover a carbon dioxide and hydrocarbonaceous fluid mixture until carbon dioxide breakthrough occurs;
    (b) determining said mixture's existing minimum miscibility pressure;
    (c) determining the extent to which it is desired to modify the existing minimum miscibility pressure;
    (d) adding alcohol into said displacing fluid in an amount sufficient to modify said pressure to the extent desired which alcohol is selected from the family comprising methanol through octanol and mixtures thereof; and (e) injecting said displacing fluid containing said alcohol into the reservoir until the desired MMP has been obtained.

25. The method as recited in claim 24 where after step (e) hydrocarbonaceous fluids are recovered.

26. The method as recited in claim 24 where a slug of alcohol is added after a slug of displacing fluid until the existing minimum miscibility pressure has been lowered to the extent desired.

27. The method as recited in claim 24 where the existing minimum miscibility pressure is lowered.

28. The method as recited in claim 24 where the alcohol increases the density and viscosity of the displacing fluid thereby reducing the tendency of the fluid to segregate or finger through the reservoir.

29. The method as recited in claim 24 where alcohol decreases the density and the viscosity of the hydrocarbon fluids thereby reducing the tendency of the displacing fluid to segregate or finger through the reservoir.

30. The method as recited in claim 24 where alcohol is added into the carbon dioxide in an amount of from about 5 to about 40 wt. %.

* * * * *